US011927899B2

(12) United States Patent
Sugiura et al.

(10) Patent No.: US 11,927,899 B2
(45) Date of Patent: Mar. 12, 2024

(54) ENDLESS BELT, TRANSFER DEVICE, AND IMAGE FORMING APPARATUS

(71) Applicant: FUJIFILM Business Innovation Corp., Tokyo (JP)

(72) Inventors: Satoya Sugiura, Kanagawa (JP); Minoru Rokutan, Kanagawa (JP); Makoto Ochiai, Kanagawa (JP); Shogo Hayashi, Kanagawa (JP); Masato Furukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/977,414

(22) Filed: Oct. 31, 2022

(65) Prior Publication Data

US 2023/0400798 A1 Dec. 14, 2023

(30) Foreign Application Priority Data

Jun. 14, 2022 (JP) ................................. 2022-096077

(51) Int. Cl.
*G03G 15/16* (2006.01)
*G03G 15/00* (2006.01)
*G03G 15/01* (2006.01)
*G03G 15/08* (2006.01)

(52) U.S. Cl.
CPC ..... *G03G 15/1615* (2013.01); *G03G 15/0189* (2013.01); *G03G 15/0815* (2013.01); *G03G 15/5054* (2013.01)

(58) Field of Classification Search
CPC ............. G03G 15/1605; G03G 15/162; G03G 15/5054
See application file for complete search history.

(56) References Cited

U.S. PATENT DOCUMENTS 6,381,428 B1 * 4/2002 Yamamoto ......... G03G 15/0194 399/116
2015/0266236 A1 * 9/2015 Farah ....................... G01R 1/18 324/663
2021/0389697 A1 * 12/2021 Furuya ............... G03G 15/1605

FOREIGN PATENT DOCUMENTS

JP 2000-075675 A 3/2000
JP 2007-326926 A 12/2007
JP 2009-150962 A 7/2009
JP 2021148943 A * 9/2021

* cited by examiner

*Primary Examiner* — Thomas S Giampaolo, II
(74) *Attorney, Agent, or Firm* — Sughrue Mion, PLLC

(57) ABSTRACT

In an endless belt, the absolute value of an electrostatic capacitance C and the absolute value of an alternating-current resistance Z when an alternating voltage of 1 Vp-p is applied in a frequency range of from 10000 Hz to 0.1 mHz from a high frequency side satisfy Formula (1) below, and an alternating-current resistance $Z_{0.63}$ when an alternating voltage of 1 Vp-p with a frequency of 0.63 Hz is applied satisfies Formula (2) below. Moreover, an alternating-current resistance $Z_{630}$ when an alternating voltage of 1 Vp-p with a frequency of 630 Hz is applied satisfies Formula (3) below:

$$\log_{10} C \leq 3.18 \times \log_{10} Z - 30.27; \quad \text{Formula (1):}$$

$$6.3 \leq \log_{10} Z_{0.63} \leq 6.9; \text{ and} \quad \text{Formula (2):}$$

$$9.1 \leq \log_{10} Z_{630} \leq 9.9. \quad \text{Formula (3):}$$

20 Claims, 2 Drawing Sheets

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-096077 filed Jun. 14, 2022.

BACKGROUND

(i) Technical Field

The present disclosure relates to an endless belt, a transfer device, and an image forming apparatus.

(ii) Related Art

Japanese Unexamined Patent Application Publication No. 2000-075675 proposes "an image forming apparatus including a transfer system in which a transfer member is brought into contact with an intermediate transfer body having a surface onto which a toner image is to be transferred to form a strip-shaped transfer nip, wherein the transfer system is configured such that, in the transfer nip, its dynamic impedance per unit length in the lengthwise direction is from 0.3 MΩ·m to 9.3 MΩ·m inclusive in any environment, and wherein the toner image on the intermediate transfer body is transferred onto a recording medium by applying a transfer bias between the intermediate transfer body and the transfer member while the recording medium is transferred through the transfer nip."

Japanese Unexamined Patent Application Publication No. 2009-150962 proposes "an image forming apparatus including an image carrier, image forming means for forming a toner image on the image carrier, first transfer means for transferring the toner image onto an intermediate transfer body, a support member that supports the intermediate transfer body, and second transfer means for holding a transfer medium between the second transfer means and the intermediate transfer body, wherein the ten-point average surface roughness $Rz_{JIS}$ of a surface of the second transfer means that is to be in contact with the transfer medium is 7 μm or less, wherein the toner image formed on the intermediate transfer body is transferred onto the transfer medium, wherein Z1≥Z2 holds, where Z1 is the impedance between a surface of the intermediate transfer body on which the toner image is to be formed and the reference potential of the image forming apparatus, and Z2 is the impedance between a surface of the second transfer means with which the transfer medium is to be in contact and the reference potential of the image forming apparatus."

SUMMARY

Aspects of non-limiting embodiments of the present disclosure relate to an endless belt. With this endless belt, the occurrence of color loss and color spots in images is reduced as compared to when the absolute value of an electrostatic capacitance C and the absolute value of an alternating-current resistance Z when an alternating voltage of 1 Vp-p is applied in a frequency range of from 10000 Hz to 0.1 mHz from a high frequency side do not satisfy Formula (1), when an alternating-current resistance $Z_{0.63}$ when an alternating voltage of 1 Vp-p with a frequency of 0.63 Hz is applied does not satisfy Formula (2), or when an alternating-current resistance $Z_{630}$ when an alternating voltage of 1 Vp-p with a frequency of 630 Hz is applied does not satisfy Formula (3).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an endless belt, wherein the absolute value of an electrostatic capacitance C and the absolute value of an alternating-current resistance Z when an alternating voltage of 1 Vp-p is applied in a frequency range of from 10000 Hz to 0.1 mHz from a high frequency side satisfy Formula (1) below, wherein an alternating-current resistance $Z_{0.63}$ when an alternating voltage of 1 Vp-p with a frequency of 0.63 Hz is applied satisfies Formula (2) below, and wherein an alternating-current resistance $Z_{630}$ when an alternating voltage of 1 Vp-p with a frequency of 630 Hz is applied satisfies Formula (3) below:

$$\log_{10} C \le 3.18 \times \log_{10} Z - 30.27; \qquad \text{Formula (1):}$$

$$6.3 \le \log_{10} Z_{0.63} \le 6.9; \text{ and} \qquad \text{Formula (2):}$$

$$9.1 \le \log_{10} Z_{630} \le 9.9. \qquad \text{Formula (3):}$$

BRIEF DESCRIPTION OF THE DRAWINGS

Exemplary embodiments of the present disclosure will be described in detail based on the following figures, wherein.

DETAILED DESCRIPTION

Figure 1:
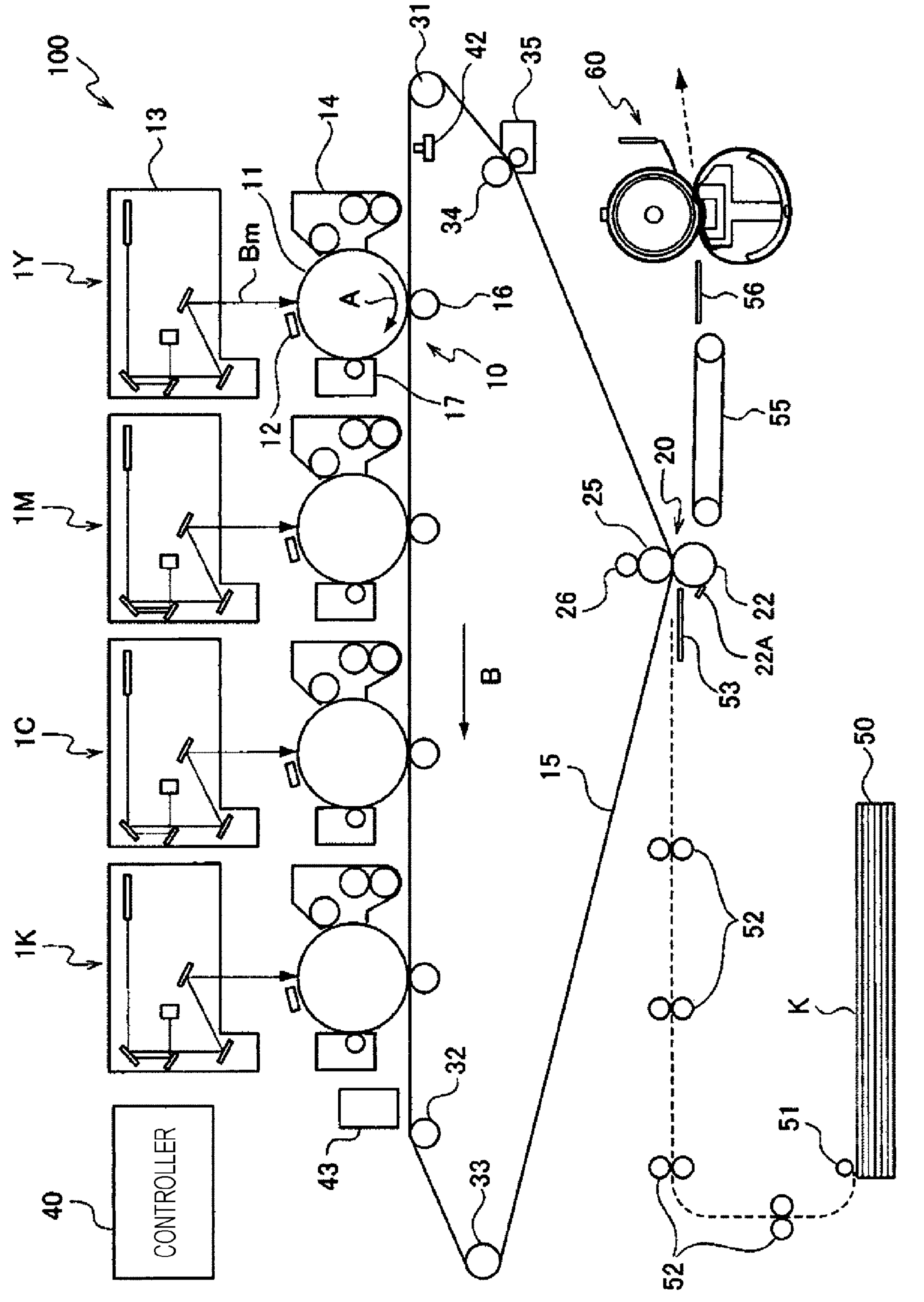
FIG. 1 is a schematic illustration showing an example of an image forming apparatus according to an exemplary embodiment.

Exemplary embodiments of the present disclosure will be described below. The following description and Examples are illustrative of the exemplary embodiments and are not intended to limit the scope of the present disclosure.

In a set of numerical ranges expressed in a stepwise manner in the present specification, the upper or lower limit in one numerical range may be replaced with the upper or lower limit in another numerical range in the set of numerical ranges expressed in a stepwise manner. Moreover, in a numerical range described in the present specification, the upper or lower limit in the numerical range may be replaced with a value indicated in an Example.

Any component may contain a plurality of materials corresponding to the component.

When reference is made to the amount of a component in a composition, if the composition contains a plurality of materials corresponding to the component, the amount means the total amount of the plurality of materials in the composition, unless otherwise specified.

<Endless Belt>

In an endless belt according to an exemplary embodiment, the absolute value of an electrostatic capacitance C and the absolute value of an alternating-current resistance Z when an alternating voltage of 1 Vp-p is applied in a frequency range of from 10000 Hz to 0.1 mHz from the high frequency side satisfy Formula (1) below, and an alternating-current resistance $Z_{0.63}$ when an alternating voltage of 1 Vp-p with a frequency of 0.63 Hz is applied satisfies Formula (2) below. Moreover, an alternating-current resistance $Z_{630}$ when an alternating voltage of 1 Vp-p with a frequency of 630 Hz is applied satisfies Formula (3) below.

$$\log_{10} C \leq 3.18 \times \log_{10} Z - 30.27 \quad \text{Formula (1):}$$

$$6.3 \leq \log_{10} Z_{0.63} \leq 6.9 \quad \text{Formula (2):}$$

$$9.1 \leq \log_{10} Z_{630} \leq 9.9 \quad \text{Formula (3):}$$

With the endless belt according to the present exemplary embodiment that has the above-described structure, the occurrence of color loss and color spots in images is reduced. The reason for this may be as follows.

In the case where a conventional endless belt is used as a second transfer belt, when a voltage is applied to a transfer nip (a region sandwiched between the second transfer belt and a back member disposed so as to face the second transfer belt), charges remain in the belt in some cases. Then, at the start of the application of a voltage in the next cycle, the remaining charges reach the surface of the belt, and this sometimes causes transverse deflection of the electric field at the surface of the belt in the transfer nip. The transverse deflection of the electric field may cause the toner to be transferred obliquely onto a recording medium.

Moreover, leakage of the transfer current may cause the toner to be scattered on a paper sheet, and color spots are thereby generated. In addition, color loss, for example, may occur in images because of abnormal discharge due to lack of the transfer current.

In the endless belt according to the present exemplary embodiment, the absolute value of the electrostatic capacitance C and the absolute value of the alternating-current resistance Z satisfy Formula (1) above. In this case, the amount of charges remaining on the belt is appropriately reduced, and the occurrence of transverse deflection of the electric field at the surface of the belt can be easily prevented. Moreover, the alternating-current resistance $Z_{0.63}$ satisfies Formula (2) above, and the alternating-current resistance $Z_{630}$ satisfies Formula (3) above. In this case, leakage of the transfer current and abnormal discharge due to lack of the transfer current can be easily prevented.

Therefore, with the endless belt according to the present exemplary embodiment, the occurrence of color loss and color spots in images is reduced.

The endless belt according to the present exemplary embodiment includes: a base layer containing carbon black and elastic materials including chloroprene rubber and ethylene propylene diene rubber; and a surface layer containing resins including a fluorocarbon resin. The content of the carbon black with respect of the total mass of the elastic materials contained in the base layer may be from 10% by mass to 40% by mass inclusive.

With the endless belt according to the present exemplary embodiment that has the structure described above, the occurrence of color loss and color spots in images is further reduced. The reason for this may be as follows.

When the composition of the base layer is as described above and the surface layer containing the resins including the fluorocarbon resin serves also as a dielectric, the endless belt according to the present exemplary embodiment can easily satisfy Formulas (1) to (3) above.

Therefore, with the endless belt according to the present exemplary embodiment, the occurrence of color loss and color spots in images is reduced.

The endless belt according to the present exemplary embodiment will be described in detail.

(Electrostatic Capacitance C and Alternating-Current Resistance Z)

In the endless belt according to the present exemplary embodiment, the absolute value of the electrostatic capacitance C and the absolute value of the alternating-current resistance Z when an alternating voltage of 1 Vp-p is applied in the frequency range of from 10000 Hz to 0.1 mHz from the high frequency side satisfy Formula (1) below.

$$\log_{10} C \leq 3.18 \times \log_{10} Z - 30.27 \quad \text{Formula (1):}$$

Preferably, the absolute value of the electrostatic capacitance C and the absolute value of the alternating-current resistance Z satisfy Formula (1-2) below.

$$\log_{10} C \leq 3.18 \times \log_{10} Z - 15.0 \quad \text{Formula (1-2):}$$

When the absolute value of the electrostatic capacitance C and the absolute value of the alternating-current resistance Z satisfy Formula (1-2) above, the absolute value of the electrostatic capacitance C is not excessively large relative to the absolute value of the alternating-current resistance Z. In this case, the amount of charges remaining in the belt can be more appropriately reduced, and the occurrence of transverse deflection of the electric field at the surface of the belt can be further reduced.

The absolute value of the electrostatic capacitance C satisfies preferably Formula (4-1) below, more preferably Formula (4-2) below, and still more preferably Formula (4-3) below.

$$-9.7 \leq \log_{10} C \quad \text{Formula (4-1):}$$

$$-9.7 \leq \log_{10} C \leq -8.5 \quad \text{Formula (4-2):}$$

$$-9.7 \leq \log_{10} C \leq -9.0 \quad \text{Formula (4-3):}$$

The electrostatic capacitance C (unit: F) and the alternating-current resistance Z (unit: Ω) are determined by impedance measurement. Its specific procedure is as follows.

A UR probe (manufactured by Mitsubishi Chemical Corporation) is connected to an SI 1260 impedance/gain phase analyzer (manufactured by TOYO Corporation) serving as a power source and an ammeter. Then the UR probe is pressed against the outer circumferential surface of the endless belt. The impedance measurement is performed while an alternating voltage of 1 Vp-p is applied in a frequency range of from 10000 Hz to 0.1 mHz from the high-frequency side to determine the electrostatic capacitance C and the alternating-current resistance Z.

(Alternating-Current Resistance $Z_{0.63}$)

In the endless belt according to the present exemplary embodiment, the alternating-current resistance $Z_{0.63}$ when an alternating voltage of 1 Vp-p with a frequency of 0.63 Hz is applied satisfies Formula (2) below.

$$6.3 \leq \log_{10} Z_{0.63} \leq 6.9 \quad \text{Formula (2):}$$

From the viewpoint of further reducing the occurrence of color loss and color spots in images, the alternating-current resistance $Z_{0.63}$ satisfies preferably Formula (2-2) below, more preferably Formula (2-3) below, and still more preferably Formula (2-4) below.

$$6.3 \leq \log_{10} Z_{0.63} \leq 6.7 \quad \text{Formula (2-2):}$$

$$6.3 \leq \log_{10} Z_{0.63} \leq 6.6 \quad \text{Formula (2-3):}$$

$$6.3 \leq \log_{10} Z_{0.63} \leq 6.5 \quad \text{Formula (2-4):}$$

When the alternating-current resistance $Z_{0.63}$ satisfies any of Formulas (2-2) to (2-4), leakage of the transfer current and abnormal discharge due to lack of the transfer current may be more easily prevented.

(Alternating-Current Resistance $Z_{630}$)

In the endless belt according to the present exemplary embodiment, the alternating-current resistance $Z_{630}$ when an alternating voltage of 1 Vp-p with a frequency of 630 Hz is applied satisfies Formula (3) below.

$$9.1 \leq \log_{10} Z_{630} \leq 9.9 \quad \text{Formula (3):}$$

From the viewpoint of further reducing the occurrence of color loss and color spots in images, the alternating-current resistance $Z_{630}$ satisfies preferably Formula (3-2) below, more preferably Formula (3-3) below, and still more preferably Formula (3-4) below.

$$9.3 \leq \log_{10} Z_{630} \leq 9.9 \quad \text{Formula (3-2):}$$

$$9.4 \leq \log_{10} Z_{630} \leq 9.9 \quad \text{Formula (3-3):}$$

$$9.4 \leq \log_{10} Z_{630} \leq 9.6 \quad \text{Formula (3-4):}$$

When the alternating-current resistance $Z_{630}$ satisfies any of Formulas (3-2) to (3-4), leakage of the transfer current and abnormal discharge due to lack of the transfer current may be more easily prevented.

The alternating-current resistance $Z_{0.63}$ (unit: Ω) and the alternating-current resistance $Z_{630}$ (unit: Ω) are determined by impedance measurement. Its specific procedure is as follows.

A UR probe (manufactured by Mitsubishi Chemical Corporation) is connected to an SI 1260 impedance/gain phase analyzer (manufactured by TOYO Corporation) serving as a power source and an ammeter. Then the UR probe is pressed against the outer circumferential surface of the endless belt.

The impedance measurement is performed while an alternating voltage of 1 Vp-p with a frequency of 0.63 Hz is applied to determine the alternating-current resistance $Z_{0.63}$.

The impedance measurement is performed while an alternating voltage of 1 Vp-p with a frequency of 630 Hz is applied to determine the alternating-current resistance $Z_{630}$.

(Structure of Endless Belt)

The endless belt according to the present exemplary embodiment may include the base layer and the surface layer.

The surface layer may be disposed on the outer circumferential surface of the base layer. If necessary, the surface layer may be disposed on the inner circumferential surface of the base layer.

The surface layer disposed on the outer circumferential surface of the base layer forms the outer circumferential surface of the endless belt. The surface layer disposed on the inner circumferential surface of the base layer forms the inner circumferential surface of the endless belt.

—Base Layer—

The base layer may contain the elastic materials. Examples of the elastic materials include rubbers and resins.

Examples of the rubbers include chloroprene rubber, epichlorohydrin rubber, isoprene rubber, butyl rubber, polyurethane, silicone rubber, fluorocarbon rubber, styrene-butadiene rubber, butadiene rubber, nitrile rubber (NBR), ethylene propylene rubber, ethylene propylene diene rubber (EPDM), natural rubber, and mixtures thereof.

Examples of the resins include polyamides, polyimides, polyamide-imides, polyether imides, polyether ether ketones, polyphenylene sulfides, polyether sulfones, polyphenylsulfones, polysulfones, polyethylene terephthalates, polybutylene terephthalates, polyacetals, polycarbonates, polyesters, and mixtures thereof.

From the viewpoint of further reducing the occurrence of color loss and color spots in images, the elastic materials include preferably a rubber and more preferably chloroprene rubber and ethylene propylene diene rubber.

When the elastic materials include chloroprene rubber and ethylene propylene diene rubber, the ratio of the mass content of the chloroprene rubber to the mass content of the ethylene propylene diene rubber (the content of the chloroprene rubber/the content of the ethylene propylene diene rubber) is preferably from 1 to 100 inclusive, more preferably from 3 to 50 inclusive, and still more preferably from 5 to 20 inclusive.

The base layer may contain electrically conductive particles.

Examples of the electrically conductive particles include: carbon black particles such as particles of Ketjen black, oil furnace black, channel black, and acetylene black; metal particles such as particles of aluminum and nickel; and metal oxide particles such as particles of indium tin oxide, tin oxide, zinc oxide, titanium oxide, and yttrium oxide.

From the viewpoint of further reducing the occurrence of color loss and color spots in images, the electrically conductive particles may be carbon black particles.

One type of electrically conductive particles may be used alone, or a combination of two or more may be used.

The average primary particle diameter of the electrically conductive particles is preferably from 1 nm to 150 nm inclusive, more preferably from 3 nm to 100 nm inclusive, and still more preferably from 5 nm to 50 nm inclusive.

The content of the electrically conductive particles is preferably from 10% by mass to 40% by mass inclusive, more preferably from 10% by mass to 35% by mass inclusive, and still more preferably from 15% by mass to 30% by mass inclusive, based on the total mass of the elastic materials contained in the base layer.

The base layer may contain a conducting agent other than the electrically conductive particles. Examples of the conducting agent include: ionic conductive materials such as potassium titanate, potassium chloride, sodium perchlorate, and lithium perchlorate; and ionic conductive polymers such as polyanilines, polyethers, polypyrroles, polysulfones, and polyacetylenes. One conducting agent may be used alone, or a combination of two or more may be used.

The base layer may contain additives such as an antioxidant, a crosslinking agent, a flame retardant, a coloring agent, a surfactant, a dispersant, and a filler.

The thickness of the base layer is preferably from 400 μm to 800 μm inclusive, more preferably from 420 μm to 600 μm inclusive, and still more preferably from 440 μm to 500 μm inclusive.

—Surface Layer—

The surface layer may contain resins (the resins contained in the surface layer are hereinafter referred to as "surface layer resins").

The surface layer resins may include a fluorocarbon resin.

Examples of the fluorocarbon resin include a tetrafluoroethylene resin, a chlorotrifluoroethylene resin, a hexafluoropropylene resin, a vinyl fluoride resin, a vinylidene fluoride resin, a dichlorodifluoroethylene resin, and copolymers thereof.

Of these, a tetrafluoroethylene resin (PTFE: polytetrafluoroethylene) may be used as the fluorocarbon resin, from the viewpoint of further reducing the occurrence of color loss and color spots in images.

The surface layer resins may include a urethane resin in addition to the fluorocarbon resin.

Generally, the urethane resin (which is referred to also as polyurethane or urethane rubber) is synthesized by polymerizing a polyisocyanate and a polyol. The urethane resin may include a hard segment and a soft segment.

The content of the fluorocarbon resin is preferably from 10% by mass to 35% by mass inclusive, more preferably from 15% by mass to 33% by mass inclusive, and still more preferably from 20% by mass to 30% by mass inclusive, based on the total mass of the resins contained in the surface layer.

When the content of the fluorocarbon resin with respect to the total mass of the resins contained in the surface layer is 10% by mass or more, the content of the fluorocarbon resin contained in the surface layer is large enough to improve the function of the surface layer as a dielectric.

When the content of the fluorocarbon resin with respect to the total mass of the resins contained in the surface layer is 35% by mass or less, mechanical strength necessary for the surface layer to have crack resistance can be obtained.

The surface layer may contain additives such as an antioxidant, a crosslinking agent, a flame retardant, a coloring agent, and a filler.

The thickness of the surface layer is preferably from 3 μm to 15 μm inclusive, more preferably from 4 μm to 12 μm inclusive, and still more preferably from 7 μm to 10 μm inclusive.

The thickness of the surface layer is measured using an optical microscope. The optical microscope used may be, for example, a digital microscope VHX manufactured by KEYENCE CORPORATION.

The procedure for measuring the thickness of the surface layer is as follows. The endless belt is cut in the thickness direction. The cross-section obtained is observed, and the thickness of the surface layer is measured in an image taken under the optical microscope.

(Method for Producing Endless Belt)

One example of a method for producing the endless belt is a production method including preparing a tubular member that later becomes the base layer and forming the surface layer on at least one of the inner and outer circumferential surfaces of the tubular member.

Examples of a method for producing the tubular member include: extrusion molding in which a composition containing the elastic materials and the electrically conductive particles is melted and the molten composition is extruded from a die into a belt shape and solidified; injection molding in which a composition containing the elastic materials and the electrically conductive particles is melted and the molten composition is injected into a belt-shaped mold and solidified; and application molding in which a composition containing precursors or monomers of the elastic materials and the electrically conductive particles is applied to a core and solidified.

Examples of a method for forming the surface layer include: a method including applying a liquid composition containing the resins including the fluorocarbon resin to at least one of the outer and inner circumferential surfaces of the tubular member and solidifying the applied liquid composition; and a method including applying a liquid composition containing the fluorocarbon resin and a precursor or a monomer of a surface layer resin other than the fluorocarbon resin to the outer or inner circumferential surface of the tubular member and solidifying the applied liquid composition. To solidify the liquid composition, the liquid composition may be dried, heated, or irradiated with an electron beam or ultraviolet rays according to the types of components.

<Transfer Device>

A transfer device according to an exemplary embodiment includes: an intermediate transfer body having an outer circumferential surface onto which a toner image is to be transferred; a first transfer unit including a first transfer member that first-transfers the toner image formed on the surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium.

In the first transfer unit, the first transfer member is disposed so as to face the image holding member with the intermediate transfer body therebetween. In the first transfer unit, the first transfer member is used to apply a voltage whose polarity is opposite to the charge polarity of the toner to the intermediate transfer body, and the toner image is thereby first-transferred onto the outer circumferential surface of the intermediate transfer body.

In the second transfer unit, the second transfer member is disposed on the toner image holding side of the intermediate transfer body. The second transfer unit further includes, in addition to the second transfer member, a back member disposed on the side opposite to the toner image holding side of the intermediate transfer body. In the second transfer unit, the intermediate transfer body and a recording medium are sandwiched between the second transfer member and the back member, and a transfer electric field is formed to second-transfer the toner image on the intermediate transfer body onto the recording medium. The second transfer member may be a second transfer roller or may be a second transfer belt. The back member used is, for example, a back roller.

From the viewpoint of reducing the occurrence of color loss and color spots in images, the second transfer member may be a second transfer belt, and the second transfer belt may be the endless belt according to the preceding exemplary embodiment.

Specifically, the transfer device according to the present exemplary embodiment may include the intermediate transfer body having the outer circumferential surface onto which a toner image is to be transferred; the first transfer unit including the first transfer member that first-transfers the toner image formed on the surface of the image holding member onto the outer circumferential surface of the intermediate transfer body; and the second transfer unit including the second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to the preceding exemplary embodiment.

The transfer device according to the present exemplary embodiment may be a transfer device that transfers a toner image onto the surface of a recording medium through a plurality of intermediate transfer bodies. Specifically, the transfer device may be, for example, as follows. A toner image is first-transferred from the image holding member onto a first intermediate transfer body, and the toner image is second-transferred from the first intermediate transfer body onto a second intermediate transfer body. Then the toner image is third-transferred from the second intermediate transfer body onto a recording medium.

<Image Forming Apparatus>

An image forming apparatus according to an exemplary embodiment includes: a toner image forming device that forms a toner image on a surface of an image holding member; and a transfer device that transfers the toner image formed on the surface of the image holding member onto a surface of a recording medium. The transfer device according to the preceding exemplary embodiment is applied to the above transfer device.

The toner image forming device is, for example, a device including: the image holding member; a charging unit for charging the surface of the image holding member; an electrostatic latent image forming unit that forms an electrostatic latent image on the charged surface of the image holding member; and a developing unit that develops the electrostatic latent image formed on the surface of the image holding member using a developer containing a toner to thereby form a toner image.

The image forming apparatus according to the present exemplary embodiment is applied to well-known image forming apparatuses such as: an apparatus including fixing means for fixing a toner image transferred onto a surface of a recording medium; an apparatus including cleaning means for cleaning the surface of the image holding member after transfer of a toner image but before charging; an apparatus including charge eliminating means for eliminating charges on the surface of the image holding member after transfer of a toner image but before charging by irradiating the surface of the image holding member with charge elimination light; and an apparatus including an image holding member-heating member for increasing the temperature of the image holding member to reduce relative temperature.

The image forming apparatus according to the present exemplary embodiment may be an image forming apparatus of a dry development type or an image forming apparatus of a wet development type (a development type using a liquid developer).

In the image forming apparatus according to the present exemplary embodiment, for example, a portion including the image holding member may have a cartridge structure that is detachable from the image forming apparatus (this portion may be a process cartridge). The process cartridge used may include a toner image forming device and a transfer device.

An example of the image forming apparatus according to the present exemplary embodiment will be described with reference to the drawings. However, the image forming apparatus according to the present exemplary embodiment is not limited thereto. In the following description, major components shown in the drawings will be described, and description of other components will be omitted.

(Image Forming Apparatus)

FIG. 1 is a schematic illustration showing the structure of the image forming apparatus according to the present exemplary embodiment.

As shown in FIG. 1, the image forming apparatus 100 according to the present exemplary embodiment is, for example, an intermediate transfer type image forming apparatus having a so-called tandem configuration and includes: a plurality of image forming units 1Y, 1M, 1C, and 1K (examples of the toner image forming device) that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and a fixing device 60 that fixes the second-transferred images onto the paper sheet K. The image forming apparatus 100 further includes a controller 40 that controls the operation of each device (each unit).

Each of the image forming units 1Y, 1M, 1C, and 1K of the image forming apparatus 100 includes a photoreceptor 11 (an example of the image holding member) that rotates in the direction of an arrow A and holds a toner image formed on its surface.

A charging unit 12 that charges the photoreceptor 11 and serves as an example of the charging unit is disposed near the circumference of the photoreceptor 11. A laser exposure unit 13 serving as an example of the electrostatic latent image forming unit and used to write an electrostatic latent image on the photoreceptor 11 is disposed above the photoreceptor 11 (in FIG. 1, an exposure beam is denoted by symbol Bm).

A developing unit 14 that serves as an example of the developing unit, contains a color toner, and visualizes the electrostatic latent image on the photoreceptor 11 with the toner is disposed near the circumference of the photoreceptor 11, and a first transfer roller 16 is provided, which transfers the color toner image formed on the photoreceptor 11 onto the intermediate transfer belt 15 in a corresponding first transfer unit 10.

A photoreceptor cleaner 17 that removes the toner remaining on the photoreceptor 11 is disposed near the circumference of the photoreceptor 11. These electrophotographic devices including the charging unit 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 is circulated (rotated) by various rollers in a direction B shown in FIG. 1 at a speed appropriate for its intended use. These rollers include: a driving roller 31 driven by a motor (not shown) excellent in constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which toner remaining on the intermediate transfer belt 15 is scraped off.

Each first transfer unit 10 includes a corresponding first transfer roller 16 facing a corresponding photoreceptor 11 with the intermediate transfer belt 15 therebetween. The first transfer roller 16 is disposed so as to be pressed against the photoreceptor 11 with the intermediate transfer belt 15 therebetween, and a voltage (first transfer bias) whose polarity is opposite to the charge polarity of the toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The back roller 25 is formed such that its surface resistivity is from $1\times10^{7}\Omega/\square$ to $1\times10^{10}\Omega/\square$ inclusive, and its hardness is set to, for example, 70° (ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 is a cylindrical roller having a volume resistivity of from $10^{7.5}$ Ω·cm to $10^{8.5}$ Ω·cm inclusive. The second transfer roller 22 is disposed so as to be pressed against the back roller 25 with the intermediate transfer belt 15 therebetween. The second transfer roller 22 is grounded, and the second transfer bias is formed between the second transfer roller 22 and the back roller 25. The toner images are second-transferred onto a paper sheet K conveyed to the second transfer unit 20.

An intermediate transfer belt cleaning member 35 is disposed downstream of the second transfer unit 20 so as to be separable from the intermediate transfer belt 15. The intermediate transfer belt cleaning member 35 removes toner and paper powder remaining on the intermediate transfer belt 15 after second transfer to thereby clean the outer circumferential surface of the intermediate transfer belt 15.

A second transfer roller cleaning member 22A is disposed downstream of the second transfer roller 22 of the second transfer unit 20. The second transfer roller cleaning member 22A removes toner and paper powder remaining on the second transfer roller 22 after second transfer to thereby clean the outer circumferential surface of the intermediate transfer belt 15. Examples of the second transfer roller cleaning member 22A include a cleaning blade. A cleaning roller may also be used.

The intermediate transfer belt 15, the first transfer rollers 16, and the second transfer roller 22 correspond to an example of the transfer device.

Figure 2:
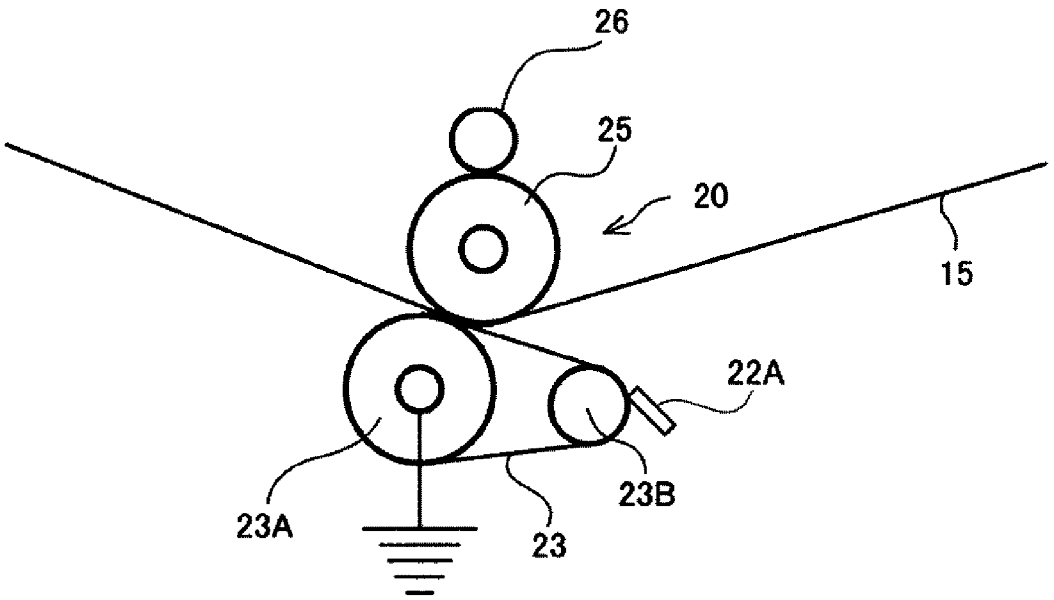
FIG. 2 is a schematic illustration showing the vicinity of a second transfer unit in another example of the image forming apparatus according to the exemplary embodiment.

From the viewpoint of reducing the occurrence of color loss and color spots in images, the image forming apparatus 100 may include a second transfer belt (an example of the second transfer member) instead of the second transfer roller 22, and the second transfer belt used may be the endless belt according to the preceding exemplary embodiment. Specifically, as shown in FIG. 2, the image forming apparatus 100 may include a second transfer unit including a second transfer belt 23, a driving roller 23A disposed so as to face the back roller 25 with the intermediate transfer belt 15 and the second transfer belt 23 interposed therebetween, and an idler roller 23B that, together with the driving roller 23A, supports the second transfer belt 23 under tension. The second transfer belt 23 used may be the endless belt according to the preceding exemplary embodiment.

A reference sensor (home position sensor) 42 that generates a reference signal used as a reference for image formation timings in the image forming units 1Y, 1M, 1C, and 1K is disposed upstream of the yellow image forming unit 1Y. An image density sensor 43 for image quality adjustment is disposed downstream of the black image forming unit 1K. When the reference sensor 42 detects a mark provided on the back side of the intermediate transfer belt 15, the reference sensor 42 generates the reference signal. The controller 40 issues instructions in response to the reference signal to start image formation in the image forming units 1Y, 1M, 1C, and 1K.

The image forming apparatus according to the present exemplary embodiment further includes, as conveyer means for conveying a paper sheet K: a paper sheet container 50 that houses paper sheets K; a paper feed roller 51 that picks up and conveys the paper sheets K stacked in the paper sheet container 50 one by one at predetermined timing; conveyer rollers 52 that convey each paper sheet K fed by the paper feed roller 51; a conveying guide 53 that feeds the paper sheet K conveyed by the conveyer rollers 52 to the second transfer unit 20; a conveyer belt 55 that conveys, to the fixing device 60, the paper sheet K conveyed by the second transfer roller 22 after second transfer; and a fixation entrance guide 56 that guides the paper sheet K to the fixing device 60.

Next, a basic image forming process of the image forming apparatus according to the present exemplary embodiment will be described.

In the image forming apparatus according to the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The electrostatic latent images formed are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) whose polarity is opposite to the charge polarity (negative polarity) of the toner is applied by the first transfer roller 16 to the base of the intermediate transfer belt 15. The toner images are thereby sequentially superposed onto the outer circumferential surface of the intermediate transfer belt 15, and the first transfer is completed.

After the toner images have been sequentially first-transferred onto the outer circumferential surface of the intermediate transfer belt 15, the intermediate transfer belt 15 moves, and the toner images are conveyed toward the second transfer unit 20. When the toner images are conveyed toward the second transfer unit 20, the paper feed roller 51 in the conveyer means starts rotating at the timing of conveyance of the toner images to the second transfer unit 20 to feed a paper sheet K of the intended size from the paper sheet container 50. The paper sheet K fed by the paper feed roller 51 is conveyed by the conveyer rollers 52 and reaches the second transfer unit 20 through the transfer guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15 therebetween. In this case, the paper sheet K conveyed at the appropriate timing is pinched between the intermediate transfer belt 15 and the second transfer roller 22. Then, when a voltage (second transfer bias) whose polarity is the same as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and conveyed by the second transfer roller 22 to the conveyer belt 55 disposed downstream, with respect to the conveyance direction of the paper sheet, of the second transfer roller 22. The conveyer belt 55 conveys the paper sheet K to the fixing device 60 at an optimal conveyance speed for the fixing device 60. The unfixed toner images on the paper sheet K conveyed to the fixing device 60 are subjected to fixation processing using heat and pressure by the fixing device 60 and thereby fixed onto the paper sheet K. The paper sheet K with the fixed image formed thereon is conveyed to an output sheet container (not shown) disposed in an output unit of the image forming apparatus.

After completion of transfer onto the paper sheet K, the toner remaining on the intermediate transfer belt 15 is conveyed to the cleaning unit by the rotation of the intermediate transfer belt 15 and is removed from the intermediate transfer belt 15 by the cleaning back roller 34 and the intermediate transfer belt cleaning member 35.

Although the exemplary embodiments have been described, the present disclosure is not to be construed as being limited to the exemplary embodiments, and various modifications, changes, and improvements are possible.

EXAMPLES

Examples will be described, but the present disclosure is not limited to the Examples. In the following description, "parts" and "%" are based on mass, unless otherwise specified.

Example 1

(Production of Base Layer)

85 parts of a mixture of chloroprene rubber used as an elastic material and carbon black used as the electrically conductive particles (the content of the carbon black with respect to the total mass of the mixture is 25% by mass) and 15 parts of ethylene propylene diene rubber used as an elastic material are mixed, and the resulting mixture is subjected to extrusion molding using a kneading extruder to thereby obtain a molded product. The molded product is subjected to hot-air drying, and a tubular body with a diameter (outer diameter) of 40 mm and a thickness of 450 μm is thereby obtained. The tubular body is cut to a length of 355 mm, and the cut product is used as a base layer.

(Production of Surface Layer)

A curing agent (LOCTITE WH-1 manufactured by Henkel Japan) is added in an amount of 1% by mass to a urethane resin (BONDERITE T862A manufactured by Henkel Japan) containing a tetrafluoroethylene resin that is a fluorocarbon resin, and the mixture is diluted with water to thereby obtain a coating solution (the content of the tetrafluoroethylene resin with respect to the total mass of the coating solution is 20% by mass).

With the center axis of the base layer maintained in the horizontal direction, the coating solution is sprayed onto the outer circumferential surface of the base layer while the base layer is rotated. Next, hot-air drying is performed at 150° C. for 35 hours to form a surface layer on the outer circumferential surface of the base layer (the surface layer formed on the outer circumferential surface of the base layer is hereinafter referred to as an outer circumferential surface layer"). The thickness of the outer circumferential surface layer is 8 μm.

The coating solution is sprayed also on the inner circumferential surface of the base layer and subjected to the hot-air drying described above to form a surface layer on the inner circumferential surface of the base layer (the surface layer formed on the inner circumferential surface of the base layer is hereinafter referred to as an "inner circumferential surface layer"). The thickness of the inner circumferential surface layer is 5 μm.

An endless belt is obtained by the above procedure.

Example 2

An endless belt is obtained using the same procedure as in Example 1 except that, in (Production of base layer), the content of the carbon black with respect to the total mass of the mixture of the chloroprene rubber and the carbon black is changed from 25% by mass to 15% by mass.

Example 3

An endless belt is obtained using the same procedure as in Example 1 except that, in (Production of base layer), the content of the carbon black with respect to the total mass of the mixture of the chloroprene rubber and the carbon black is changed from 25% by mass to 30% by mass.

Comparative Example 1

An endless belt is obtained using the same procedure as in Example 1 except that, in (Production of base layer), the content of the carbon black with respect to the total mass of the mixture of the chloroprene rubber and the carbon black is changed from 25% by mass to 15% by mass and that the ethylene propylene diene rubber is not added.

Comparative Example 2

A second transfer belt for Iridesse Digital Press (manufactured by FUJIFILM Business Innovation Corp.) is prepared.

Comparative Example 3

A second transfer belt for Color 1000 Press (manufactured by FUJIFILM Business Innovation Corp.) is prepared.

Comparative Example 4

An endless belt is obtained using the same procedure as in Example 1 except that, in (Production of base layer), the content of the carbon black with respect to the total mass of the mixture of the chloroprene rubber and the carbon black is changed from 25% by mass to 30% by mass, that, in (Production of surface layer), BONDERITE T845B manufactured by Henkel Japan is used instead of the urethane resin (BONDERITE T862A manufactured by Henkel Japan) containing a tetrafluoroethylene resin that is a fluorocarbon resin, and that the thickness of the outer circumferential surface layer is changed to 12 μm.

Example 4

An endless belt is obtained using the same procedure as in Example 1 except that, in (Production of base layer), the content of the carbon black with respect to the total mass of the mixture of the chloroprene rubber and the carbon black is changed from 25% by mass to 30% by mass and that, in (Production of surface layer), DM-A6000 manufactured by Daizo Corporation is used instead of the urethane resin (BONDERITE T862A manufactured by Henkel Japan) containing a tetrafluoroethylene resin that is a fluorocarbon resin.

<Evaluation>

One of the endless belts obtained in the above Examples and Comparative Examples is attached as a second transfer belt to an ApeosPro C810 (manufactured by FUJIFILM Business Innovation Corp.) and evaluated by the following procedures.

(Image Evaluation)

20 mm×20 mm cyan image patches with different image densities ranging from 10% to 100% in steps of 10% are outputted on an A3 coated paper sheet, and evaluation is performed by observing a patch having the roughest appearance.

—Evaluation Criteria—

A: No missing dots are found by visual inspection and observation through a magnifying glass (the missing dots are caused by the occurrence of color loss or color spots in the image. The same applies to the following).

B: No missing dots are found by visual inspection, but some missing dots are found by observation through a magnifying glass.

C: Missing dots are found by visual inspection.

D: Dots themselves are missing and cannot be recognized visually.

(Evaluation of Sheet Conveyability)

An A3 tracing paper sheet (40 gsm) fed from a bypass tray is outputted to evaluate sheet conveyability.

—Evaluation Criteria—

A: The sheet is outputted normally.

B: The sheet is outputted, but wrinkles are found by visual inspection.

C: Paper jamming occurs, and the sheet cannot be outputted.

TABLE 1

| | Physical properties | | | | | | | |
|---|---|---|---|---|---|---|---|---|
| | | Formula (1) | | Formula (1-2) | | | | |
| | Minimum value of $\log_{10}C$ | Maximum value of $\log_{10}C$ | Minimum value of $3.18 \times \log_{10}Z - 30.27$ | Minimum value of $3.18 \times \log_{10}Z - 15.0$ | $\log_{10}C_{0.63}$ | Formula (2) $\log_{10}Z_{0.63}$ | $\log_{10}C_{630}$ | Formula (3) $\log_{10}Z_{630}$ |
| Example 1 | −9.8 | −8.6 | −2.3 | 13.0 | −9.4 | 6.8 | −9.1 | 9.2 |
| Example 2 | −9.9 | −8.6 | −1.7 | 13.6 | −9.7 | 6.5 | −9.0 | 9.5 |
| Example 3 | −9.8 | −8.5 | −0.1 | 15.2 | −9.6 | 6.6 | −8.8 | 9.9 |
| Comparative Example 1 | −10.5 | −9.5 | −6.4 | 8.9 | −10.1 | 8 | −10.5 | 9.0 |
| Comparative Example 2 | −10.3 | −9.5 | −0.1 | 15.2 | −10.0 | 10 | −9.8 | 10.5 |
| Comparative Example 3 | −11 | −9.8 | −14.4 | 0.9 | −10.0 | 5.5 | −10.0 | 6.0 |
| Comparative Example 4 | −11.0 | −9.5 | −16.0 | 0.9 | −10.0 | 5.5 | −10.0 | 6.0 |
| Example 4 | −10.00 | −9.6 | −1.7 | 0.5 | −9.6 | 6.5 | −8.9 | 9.8 |

| | Composition etc. | | | | | |
|---|---|---|---|---|---|---|
| | Base layer | | Outer circumferential surface layer | | Evaluation | |
| | Types of elastic materials | Content of CB (%) | Content of fluorocarbon resin (%) | Thickness (μm) | Image evaluation | Sheet conveyability evaluation |
| Example 1 | CR and EPDM | 27 | 30 | 8 | B | A |
| Example 2 | CR and EPDM | 15 | 30 | 8 | A | A |
| Example 3 | CR and EPDM | 34 | 30 | 8 | B | A |

TABLE 1-continued

| | | | | | | |
|---|---|---|---|---|---|---|
| Comparative Example 1 | CR | 18 | 30 | 8 | D | B |
| Comparative Example 2 | CR and EPDM | 10 | 10 | 8 | C | C |
| Comparative Example 3 | CR and EPDM | 40 | 10 | 8 | D | B |
| Comparative Example 4 | CR and EPDM | 34 | 10 | 12 | D | C |
| Example 4 | CR and EPDM | 34 | 25 | 8 | B | A |

Terms in Table 1 will be described.

Minimum value of $\log_{10} C$: The minimum of the common logarithms $\log_{10} C$ of the absolute values of the electrostatic capacitances C obtained by impedance measurement.

Maximum value of $\log_{10} C$: The maximum of the common logarithms $\log_{10} C$ of the absolute values of the electrostatic capacitances C obtained by the impedance measurement.

Minimum value of $3.18\times\log_{10} Z-30.27$: The minimum of the values of $3.18\times\log_{10} Z-30.27$ computed using the absolute values of the alternating-current resistances Z obtained by the impedance measurement.

Minimum value of $3.18\times\log_{10} Z-15.0$: The minimum of the values of $3.18\times\log_{10} Z-15.0$ computed using the absolute values of the alternating-current resistances Z obtained by the impedance measurement.

$\log_{10} C_{0.63}$: The common logarithm of the absolute value of an electrostatic capacitance $C_{0.63}$ measured by a procedure described later.

$\log_{10} C_{630}$: The common logarithm of the absolute value of an electrostatic capacitance $C_{630}$ measured by the procedure described later.

Types of elastic materials: "CR" is chloroprene rubber, and "EPDM" is ethylene propylene diene rubber.

Content of CB (%): The content of carbon black with respect to the total mass of the elastic materials contained in the base layer.

Content of fluorocarbon resin (%): The content of the fluorocarbon resin with respect to the total mass of the resins contained in the surface layer.

Procedure for measuring electrostatic capacitance $C_{0.63}$ and electrostatic capacitance $C_{630}$ The electrostatic capacitance $C_{0.63}$ (unit: F) and the electrostatic capacitance $C_{630}$ (unit: F) are determined by impedance measurement. Its specific procedure is as follows.

A UR probe (manufactured by Mitsubishi Chemical Corporation) is connected to an SI 1260 impedance/gain phase analyzer (manufactured by TOYO Corporation) serving as a power source and an ammeter. Then the UR probe is pressed against the outer circumferential surface of the endless belt.

The impedance measurement is performed while an alternating voltage of 1 Vp-p with a frequency of 0.63 Hz is applied to determine the electrostatic capacitance $C_{0.63}$.

The impedance measurement is performed while an alternating voltage of 1 Vp-p with a frequency of 630 Hz is applied to determine the electrostatic capacitance $C_{630}$.

As can be seen from the above results, with the endless belts in the Examples, the occurrence of color loss and color spots in images can be reduced.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An endless belt, wherein the absolute value of an electrostatic capacitance C and the absolute value of an alternating-current resistance Z when an alternating voltage of 1 Vp-p is applied in a frequency range of from 10000 Hz to 0.1 mHz from a high frequency side satisfy Formula (1) below, wherein an alternating-current resistance $Z_{0.63}$ when an alternating voltage of 1 Vp-p with a frequency of 0.63 Hz is applied satisfies Formula (2) below, and wherein an alternating-current resistance $Z_{630}$ when an alternating voltage of 1 Vp-p with a frequency of 630 Hz is applied satisfies Formula (3) below:

$$\log_{10} C\leq 3.18\times\log_{10} Z-30.27; \quad \text{Formula (1):}$$

$$6.3\leq\log_{10} Z_{0.63}\leq 6.9; \text{ and} \quad \text{Formula (2):}$$

$$9.1\leq\log_{10} Z_{630}\leq 9.9. \quad \text{Formula (3):}$$

(((2)))

The endless belt according to (((1))), wherein the absolute value of the electrostatic capacitance C and the absolute value of the alternating-current resistance Z satisfy the following Formula (1-2):

$$\log_{10} C\leq 3.18\times\log_{10} Z-15.0. \quad \text{Formula (1-2):}$$

(((3)))

The endless belt according to (((1))) or (((2))), wherein the alternating-current resistance $Z_{630}$ satisfies the following Formula (3-3):

$$9.4\leq\log_{10} Z_{630}\leq 9.9. \quad \text{Formula (3-3):}$$

(((4)))

The endless belt according to (((3))), wherein the alternating-current resistance $Z_{0.63}$ satisfies the following Formula (2-4):

$$6.3\leq\log_{10} Z_{0.63}\leq 6.5. \quad \text{Formula (2-4):}$$

(((5)))

The endless belt according to any one of (((1))) to (((4))), wherein the absolute value of the electrostatic capacitance C satisfies the following Formula (4-1):

$$-9.7\leq\log_{10} C. \quad \text{Formula (4-1):}$$

(((6)))

The endless belt according to (((1))), including:

a base layer containing carbon black and elastic materials including chloroprene rubber and ethylene propylene diene rubber; and a surface layer containing resins including a fluorocarbon resin, wherein the content of the carbon black with respect to the total mass of the elastic materials contained in the base layer is from 10% by mass to 40% by mass inclusive.

(((7)))

The endless belt according to (((6))), wherein the content of the fluorocarbon resin with respect to the total mass of the resins contained in the surface layer is from 10% by mass to 35% by mass inclusive.

(((8)))

The endless belt according to (((7))), wherein the surface layer has a thickness of from 3 μm to 15 μm inclusive.

(((9)))

A transfer device including:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to any one of (((1))) to (((8))).

(((10)))

An image forming apparatus including:

a toner image forming device that includes an image holding member and forms a toner image on a surface of the image holding member; and a transfer device that transfers the toner image formed on the surface of the image holding member onto a surface of a recording medium, the transfer device being the transfer device according to (((9))).

What is claimed is:

1. An endless belt, wherein the absolute value of an electrostatic capacitance C and the absolute value of an alternating-current resistance Z when an alternating voltage of 1 Vp-p is applied in a frequency range of from 10000 Hz to 0.1 mHz from a high frequency side satisfy Formula (1) below, wherein an alternating-current resistance $Z_{0.63}$ when an alternating voltage of 1 Vp-p with a frequency of 0.63 Hz is applied satisfies Formula (2) below, and wherein an alternating-current resistance $Z_{630}$ when an alternating voltage of 1 Vp-p with a frequency of 630 Hz is applied satisfies Formula (3) below:

$$\log_{10} C \leq 3.18 \times \log_{10} Z - 30.27; \quad \text{Formula (1):}$$

$$6.3 \leq \log_{10} Z_{0.63} \leq 6.9; \text{ and} \quad \text{Formula (2):}$$

$$9.1 \leq \log_{10} Z_{630} \leq 9.9. \quad \text{Formula (3):}$$

2. The endless belt according to claim 1, wherein the absolute value of the electrostatic capacitance C and the absolute value of the alternating-current resistance Z satisfy the following Formula (1-2):

$$\log_{10} C \leq 3.18 \times \log_{10} Z - 15.0. \quad \text{Formula (1-2):}$$

3. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 2.

4. An image forming apparatus comprising:

a toner image forming device that includes an image holding member and forms a toner image on a surface of the image holding member; and a transfer device that transfers the toner image formed on the surface of the image holding member onto a surface of a recording medium, the transfer device being the transfer device according to claim 3.

5. The endless belt according to claim 1, wherein the alternating-current resistance $Z_{630}$ satisfies the following Formula (3-3):

$$9.4 \leq \log_{10} Z_{630} \leq 9.9. \quad \text{Formula (3-3):}$$

6. The endless belt according to claim 5, wherein the alternating-current resistance $Z_{0.63}$ satisfies the following Formula (2-4):

$$6.3 \leq \log_{10} Z_{0.63} \leq 6.5. \quad \text{Formula (2-4):}$$

7. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 6.

8. An image forming apparatus comprising:

a toner image forming device that includes an image holding member and forms a toner image on a surface of the image holding member; and a transfer device that transfers the toner image formed on the surface of the image holding member onto a surface of a recording medium, the transfer device being the transfer device according to claim 7.

9. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 5.

10. An image forming apparatus comprising:

a toner image forming device that includes an image holding member and forms a toner image on a surface of the image holding member; and a transfer device that transfers the toner image formed on the surface of the image holding member onto a surface of a recording medium, the transfer device being the transfer device according to claim 9.

11. The endless belt according to claim 1, wherein the absolute value of the electrostatic capacitance C satisfies the following Formula (4-1):

$$-9.7 \leq \log_{10} C. \qquad \text{Formula (4-1):}$$

12. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 11.

13. The endless belt according to claim 1, comprising:

a base layer containing carbon black and elastic materials including chloroprene rubber and ethylene propylene diene rubber; and a surface layer containing resins including a fluorocarbon resin, wherein the content of the carbon black with respect to the total mass of the elastic materials contained in the base layer is from 10% by mass to 40% by mass inclusive.

14. The endless belt according to claim 13, wherein the content of the fluorocarbon resin with respect to the total mass of the resins contained in the surface layer is from 10% by mass to 35% by mass inclusive.

15. The endless belt according to claim 14, wherein the surface layer has a thickness of from 3 μm to 15 μm inclusive.

16. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 15.

17. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 13.

18. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 14.

19. A transfer device comprising:

an intermediate transfer body having an outer circumferential surface onto which a toner image is to be transferred;

a first transfer unit including a first transfer member that first-transfers a toner image formed on a surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium, the second transfer member being the endless belt according to claim 1.

20. An image forming apparatus comprising:

a toner image forming device that includes an image holding member and forms a toner image on a surface of the image holding member; and a transfer device that transfers the toner image formed on the surface of the image holding member onto a surface of a recording medium, the transfer device being the transfer device according to claim 19.

* * * * *